Patented May 2, 1944

2,347,840

UNITED STATES PATENT OFFICE 2,347,840

CONDENSATION OF NITRO COMPOUNDS WITH POLYSULPHIDES AND PRODUCT THEREOF

Edwin M. Nygaard, Woodbury, N. J., assignor to Socony-Vacuum Oil Company, Incorporated, a corporation of New York No Drawing. Application September 23, 1942, Serial No. 459,445

20 Claims. (Cl. 260—79)

This invention relates to a composition of matter having elastic properties prepared by the reaction of alkaline polysulphides and nitroparaffins wherein the nitro group of the substituted paraffin is activated by the presence on the same carbon atom of another group capable of reacting with alkaline polysulphides. The invention also includes the process of preparing the novel products.

I have found that the alkaline polysulphides do not react with nitroparaffins to eliminate the nitro group unless the carbon atom substituted with a nitro group bears another group capable of promoting such a reaction. The other substituent may be any of the negative radical substituents previously known to be reactive in this manner or it may be another nitro group. The reaction is seen to be similar in some important respects to that by which the so-called "Thiokols" are prepared, although important differences will appear below.

Numerous patents assigned to J. C. Patrick and the Thiokol Corporation relate in general to products obtained by the interaction of water-or-alcohol-soluble polysulphides and olefin compounds containing the group $C_nH_{2n}$ combined with negative radicals such as chlorine, bromine, iodine, nitrate, sulphate, acid sulphate, carbonate, acetate, propionate, acid phosphate, tartrate and acid tartrate. Other compounds listed as reacting with the polysulphides to produce polymeric materials are ethylene chlorydrin, ethylene oxide, diethylene dioxide, formaldehyde, polymerized formaldehyde, chlorisoprene, vinyl acetylene, furfuraldehyde, B,B'-dichloro-ethylether, hexamethylene tetramine and methylene dihalides. The polysulphides employed may be alkali, alkaline earth, ammonium or that prepared from ethanol amine.

Most of the polymers are prepared from alkylene chlorides such as ethylene chloride or B,B'-dichloro-ethylether, since, in general, these are the cheapest and most readily available. During the present emergency, when chlorine is on the priorities list, there is a particularly important advantage in using raw materials which use less chlorine or no chlorine at all, such as is practiced in my process described below.

We have found that nitroparaffins in which the carbon atom bearing the nitro group also is substituted by a halogen atom, another nitro group or any other alkaline polysulphide reactive group react with alkaline polysulphide reagents to give a polymeric material containing a high proportion of sulphur and a small amount of nitrogen. The alkaline polysulphide reagents may be alkali, alkaline earth or ammonium polysulphides.

With 2-chloro-2-nitropropane and $Na_2S_2$ the reaction may be formulated as follows:

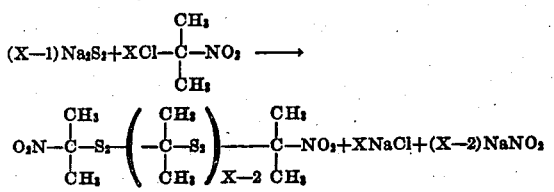

Although the structure of the polymer is represented as terminating in $NO_2$ groups, I do not wish to restrict the invention to any particular formulation. The analyses do indicate a small percentage of nitrogen in the polymer, but it is conceivable that the nitrogen might be in some other form than a nitro group.

At first sight, this reaction appears to be quite similar to that described by Patrick and the Thiokol Corporation patents, but there are several essential differences.

In the patents above referred to, the reaction proceeds as well whether the negative groups (e. g. chlorine) are on the same or on different carbon atoms. I have found that the desired product is obtained only when the two reacting groups are on the same carbon atom. For example, no polymeric material at all is obtained by treating any one of the following substances with sodium polysulphide reagent:

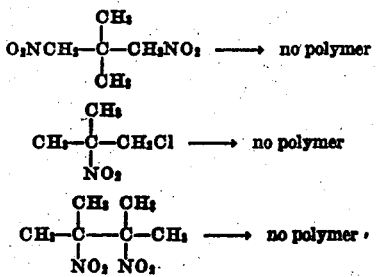

In the above cases there was no reaction to give a polymer at 0° or up to the temperature of a boiling water bath (approximately 100° C.)

A reaction to give a polymeric material with sodium polysulphide readily took place at 0° C. with the following substances:

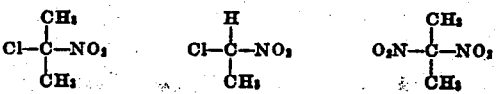

The temperatures employed to produce the polymeric material are quite different also. I have found that polymeric materials by the present procedure are formed at 0° C. whereas the reaction temperatures employed to produce the polymeric materials described in the cited patent literature are never described as taking place below room temperature, and in most cases, the temperature is elevated to get an appreciable reaction velocity.

It is also believed that there is strong evidence for not classifying the NO₂ group as a negative group in the sense that halogen, sulphate, oxalate, etc. groups are so described since the replacement of even one or both halogen atoms by nitro groups in the formulas listed below produces no polymer with sodium polysulphides:

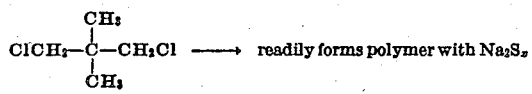

Replacement of 2 chlorine atoms by NO₂ groups:

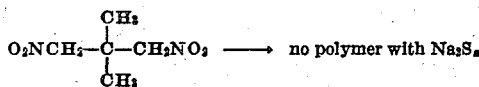

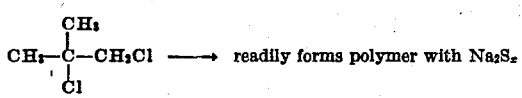

Replacement of one halogen by a nitro group:

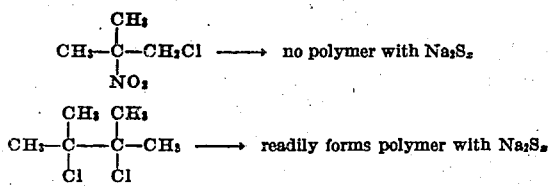

Replacement of both chlorine atoms by nitro groups:

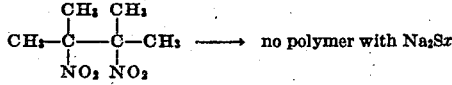

The polymeric materials prepared by my process are quite different from those described in the cited patent literature. My materials are soluble in benzene, whereas the Thiokols are not. The product obtained by my process with Na₂S₂ is soft, while that obtained from Na₂S₄ is more rigid. The corresponding Thiokol derivatives prepared from Na₂S₂ are described as hard, resembling vulcanite, while that obtained from Na₂S₄ is described as soft, pliable and elastic.

It has been found that the properties of the plastics produced by this process can be modified by blending with various compounding agents used in the rubber industry such as sulphur, zinc oxide, carbon black, vulcanization accelerators, etc.

Example I

*Polymer prepared from 2-chloro-2-nitropropane and sodium disulphide*

The sodium disulphide reagent was prepared in a three-necked flask equipped with a stirrer, thermometer and condenser by dissolving 7.5 parts of Na₂S·9H₂O in 14.2 parts of water and heating the resulting solution to a maximum temperature of 88° C. with 1.0 part of sulphur. The clear sodium disulphide solution was cooled to 25° C. and to it a few drops of 2-chloro-2-nitropropane were added, followed by 5.1 parts of petroleum ether. The remainder of the chloronitropropane was added over a period of one hour and thirty-eight minutes, the temperature not exceeding 32° C. during the addition. The mixture was stirred eight minutes longer. The petroleum ether and aqueous layer were decanted off. The residue was a sticky, colorless to pearl gray polymer amounting to 0.30 part based on the weight of 2-chloro-2-nitropropane originally taken. The polymeric material was washed with water on a rubber mill, milled until almost dry, dried in a desiccator over calcium chloride and then analyzed. Analysis showed it contained 49.4% sulphur and 1.16% nitrogen.

Other materials recovered from the reaction were 0.31 part of yellow oil recovered from the petroleum ether, 0.14 part of elementary sulphur and 0.08 part 2-nitroso-2-nitropropane obtained by acidification of the aqueous layer.

Example II

*Polymer prepared from 2,2-dinitropropane and sodium disulphide*

The 2,2-dinitropropane was prepared by oxidizing 2-nitroso-2-nitropropane with chromic acid in glacial acetic acid. Reference A. 180 147 (1876) V. Meyer.

The 2-nitroso-2-nitropropane was prepared from 2-nitropropane essentially according to the directions given by V. Meyer, A. 175 120 (1875). The only modification used was the employment of NaOH, NaNO₂ and dilute hydrochloric acid in place of KOH, KNO₂ and dilute sulphuric acid, respectively.

The sodium disulphide reagent was prepared in a three-necked flask equipped with a stirrer and thermometer by dissolving 7.5 parts of Na₂S·9H₂O in 14.0 parts of distilled water and heating the resulting solution to a maximum temperature of 60° C. with 1.0 part of sulphur. The resulting clear sodium disulphide solution was cooled with an ice bath and to it was added 2.0 parts of solid 2,2-dinitropropane. The mixture was stirred at 0° C. for some time and 14.4 parts of petroleum ether were added. The mixture was stirred for three and one-half hours at 0° C. To the cold aqueous layer was slowly added 4.3 parts of (1-1) conc. hydrochloric acid-water. A bluish-colored, plastic mass was formed and removed from the liquid. It was thoroughly washed with water. It hardened on drying to a brittle cream-colored solid. The product weighed 0.24 part based on the original weight of 2,2-dinitropropane. Analysis of the product dried in a desiccator over calcium chloride revealed a sulphur content of 75.4 per cent and a nitrogen content of 0.39 per cent.

Further addition of 2.1 parts of dilute hydrochloric acid produced 0.2 part of a bluish-colored polymer. Upon washing and drying, it became a yellow, spongy mass possessing some plasticity. Analysis of the dry sample showed it contained 70.4 per cent sulphur and 0.54 per cent nitrogen.

Example III

*Polymer prepared from 2-chloro-2-nitropropane and ammonium disulphide*

The ammonium disulphide reagent was prepared in a three-necked flask equipped with a stirrer, dropping funnel and thermometer by dissolving one part of sulphur in 10.6 parts of a 20% solution of ammonium sulphide. The reagent was cooled to between 5 and 10° C. with an ice bath and to it was slowly added over a period of thirty-three minutes 1.8 parts of 2-chloro-2- nitropropane. The ammonium disulphide reagent became first cloudy, then a sticky polymeric material separated and collected on the sides and bottom of the flask. The reaction mixture was stirred about five minutes longer and then 2.3 parts of petroleum ether were added and the stirring continued a few minutes more. The polymer was separated from the reaction mixture and washed thoroughly with water and dried in a desiccator. The weight of the dry polymer was 0.47 part based on the weight of 2-chloro-2-nitropropane taken.

In addition to the polymer, 0.05 part of pale-yellow oil was isolated from the petroleum ether layer, and by acidifying the aqueous phase with dilute hydrochloric acid, 0.57 part of a mixture composed mostly of sulphur and very little polymer and about 0.02 part of 2-nitroso-2-nitropropane were obtained. The above weights are based on the weight of 2-chloro-2-nitropropane originally taken.

Although in all the specific illustrations given for the preparation of the polymer, petroleum ether has been added, this is not essential to the process. It has been used merely to free the polymer from a small quantity of oily by-products. Further experimentation has indicated that if larger proportions of polysulphide reagent are used, the oily by-products are not formed and the polymer yield is correspondingly increased.

I claim:

1. A composition of matter prepared by reacting an alkaline polysulphide with a substituted paraffin hydrocarbon having a nitro group and one other radical reactive with alkaline polysulphides on the same carbon atom.

2. A composition of matter prepared by reacting an alkaline polysulphide with a substituted paraffin hydrocarbon having two nitro groups substituted on the same carbon atom.

3. A composition of matter prepared by reacting an alkaline polysulphide with a substituted paraffin hydrocarbon having a nitro group and a halogen substituted on the same carbon atom.

4. A composition of matter prepared by reacting an alkaline polysulphide with a substituted paraffin hydrocarbon having a nitro group and chlorine substituted on the same carbon atom.

5. A composition of matter prepared by reacting a sodium polysulphide with a substituted paraffin hydrocarbon having a nitro group and one other radical reactive with alkaline polysulphides on the same carbon atom.

6. A composition of matter prepared by reacting a sodium polysulphide with a substituted paraffin hydrocarbon having two nitro groups substituted on the same carbon atom.

7. A composition of matter prepared by reacting a sodium polysulphide with a substituted paraffin hydrocarbon having a nitro group and a halogen substituted on the same carbon atom.

8. A composition of matter prepared by reacting 2-chloro-2-nitropropane with sodium disulphide.

9. A composition of matter prepared by reacting 2,2-dinitro-propane with sodium disulphide.

10. A composition of matter prepared by reacting 2-chloro-2-nitropropane with ammonium disulphide.

11. A process which comprises reacting an alkaline polysulphide with a substituted paraffin hydrocarbon having a nitro group and one other radical reactive with alkaline polysulphides on the same carbon atom.

12. A process which comprises reacting an alkaline polysulphide with a substituted paraffin hydrocarbon having two nitro groups substituted on the same carbon atom.

13. A process which comprises reacting an alkaline polysulphide with a substituted paraffin hydrocarbon having a nitro group and a halogen substituted on the same carbon atom.

14. A process which comprises reacting an alkaline polysulphide with a substituted paraffin hydrocarbon having a nitro group and chlorine substituted on the same carbon atom.

15. A process which comprises reacting a sodium polysulphide with a substituted paraffin hydrocarbon having a nitro group and one other radical reactive with alkaline polysulphides on the same carbon atom.

16. A process which comprises reacting a sodium polysulphide with a substituted paraffin hydrocarbon having two nitro groups substituted on the same carbon atom.

17. A process which comprises reacting a sodium polysulphide with a substituted paraffin hydrocarbon having a nitro group and a halogen substituted on the same carbon atom.

18. A process which comprises reacting 2-chloro-2-nitropropane with sodium disulphide.

19. A process which comprises reacting 2,2-dinitropropane with sodium disulphide.

20. A process which comprises reacting 2-chloro-2-nitropropane with ammonium disulphide.

EDWIN M. NYGAARD.